US010540889B2

(12) United States Patent
Ikeler et al.

(10) Patent No.: US 10,540,889 B2
(45) Date of Patent: Jan. 21, 2020

(54) REMOTE MONITORING AND CONTROL OF MOVABLE BARRIER STATUS

(71) Applicant: GMI Holdings, Inc., Mt. Hope, OH (US)

(72) Inventors: Tim Ikeler, Alliance, OH (US); Leroy G. Krupke, Carrollton, TX (US); Brent Buescher, Wooster, OH (US); Brent Alan Rauscher, Keller, TX (US); Gregory D. Matias, Copley, OH (US); Michael Dragomier, North Canton, OH (US)

(73) Assignee: GMI Holdings, Inc., Mount Hope, OH (US)

( * ) Notice: Subject to any disclaimer, the term of this patent is extended or adjusted under 35 U.S.C. 154(b) by 0 days.

(21) Appl. No.: 15/800,510

(22) Filed: Nov. 1, 2017

(65) Prior Publication Data

US 2018/0330605 A1 Nov. 15, 2018

Related U.S. Application Data

(60) Provisional application No. 62/513,943, filed on Jun. 1, 2017, provisional application No. 62/505,711, filed on May 12, 2017.

(51) Int. Cl.
*H02K 7/14* (2006.01)
*G08C 23/04* (2006.01)
(Continued)

(52) U.S. Cl.
CPC ............ *G08C 23/04* (2013.01); *E05F 15/668* (2015.01); *G07C 9/00119* (2013.01); *E05Y 2900/106* (2013.01); *G08C 2201/50* (2013.01)

(58) Field of Classification Search
CPC ... G08C 23/04; G08C 2201/50; E05F 15/668; G07C 9/00119
(Continued)

(56) References Cited

U.S. PATENT DOCUMENTS 3,262,105 A 7/1966 Bell
4,338,553 A 7/1982 Scott, Jr.
(Continued)

FOREIGN PATENT DOCUMENTS

CH 707464 A2 7/2014
WO 2006066213 A2 6/2006

OTHER PUBLICATIONS

European Search Report in corresponding European Patent Application No. 18171888.3, dated Oct. 1, 2018, 9 pages.

*Primary Examiner* — Bickey Dhakal
*Assistant Examiner* — Gabriel Agared
(74) *Attorney, Agent, or Firm* — Haynes and Boone, LLP

(57) ABSTRACT

A system for enabling both the remote monitoring and receipt of remote change-of-door status commands, via the Internet, of the open or closed status of the garage door. The system includes an encoder generating signal pulses as a function of the motor and garage door movement. A microprocessor processes the signal pulses to generate digital pulses indicative of the open or closed status of the garage door, which status is wirelessly transmitted, via the Internet, for remote monitoring. Change-of-door status commands remotely transmitted, via the Internet, are received by the system to activate a warning and delayed change of door status.

6 Claims, 7 Drawing Sheets

(51) Int. Cl.
*E05F 15/668* (2015.01)
*G07C 9/00* (2006.01)

(58) Field of Classification Search
USPC .............................................................. 318/3
See application file for complete search history.

(56) References Cited

U.S. PATENT DOCUMENTS

| | | | | |
|---|---|---|---|---|
| 5,039,925 | A | 8/1991 | Schap | |
| 6,229,276 | B1 | 5/2001 | Fitzgibbon et al. | |
| 6,376,832 | B1 | 4/2002 | Smith et al. | |
| 6,495,983 | B1 * | 12/2002 | Stern | G05B 19/42 318/567 |
| 6,998,977 | B2 | 2/2006 | Gregori et al. | |
| 7,071,813 | B2 | 7/2006 | Fitzgibbon | |
| 7,224,275 | B2 | 5/2007 | Fitzgibbon | |
| 8,587,404 | B2 * | 11/2013 | Laird | E05F 15/684 116/2 |
| 2006/0197481 | A1 * | 9/2006 | Hotto | G05B 19/042 318/280 |
| 2010/0127882 | A1 * | 5/2010 | Sitarski | E05F 15/77 340/686.1 |
| 2015/0084779 | A1 * | 3/2015 | Saladin | G07C 9/00896 340/686.6 |
| 2016/0281411 | A1 * | 9/2016 | Calagaz, Jr. | E05F 15/77 |

* cited by examiner

REMOTE MONITORING AND CONTROL OF MOVABLE BARRIER STATUS

CROSS REFERENCE TO RELATED APPLICATION

This application claims the benefit of U.S. Provisional Application Nos. 62/505,711 and 62/513,943, both titled "REMOTE NETWORK MONITORING AND CONTROL OF A MOVABLE BARRIER" filed May 12, 2017, and Jun. 1, 2017, respectively, both of which are hereby incorporated by reference in their entirety for all purposes.

TECHNICAL FIELD

The present disclosure relates to the field of remote network monitoring and controlling of the status of a movable barrier, more particularly to the initial determination of the open/close status of a garage door and the subsequent wireless transmission, via the Internet, of such status to an Internet access device such as a user's handheld Smartphone, and even more particularly, in response to the receipt of such garage door status, the transmission, via the Internet, of a change-of-door-status command to move the garage door in compliance with such command.

BACKGROUND

Movable barriers, such as upward-acting sectional or single panel garage doors, residential and commercial rollup doors, and slidable and swingable gates, are used to alternatively allow and restrict entry to building structures and property. These barriers are driven between their respective open and closed positions by motors or other motion-imparting mechanisms, which are themselves controlled by barrier moving units, sometimes referred to as "movable barrier operators," and in the specific case of a door, as "door operators," and in the even more specific case of a garage door, as "garage door operators." Garage door operators are effective to cause the DC or AC motor, and accompanying motor drive assembly, to move the associated garage door, typically between its open and closed positions.

Each garage door operator includes a door controller (typically, a microprocessor, microcontroller, or other programmable platform) for processing incoming door commands and generating output control signals to the motor which, in combination with its associated drive assembly, moves the garage door in accordance with the incoming door commands. The incoming door commands, in the past, have been in the form of wired or wireless signals transmitted from interior or exterior wall consoles, or from proximately located hand held or vehicle mounted RF transmitters.

However, with the near ubiquity of the Internet and the proliferation of electronic devices and equipment designed to access the Internet, such as personal computers, cellphones, and Smartphones, systems are currently being designed and implemented in the trade that enable non-proximate, or remote, monitoring and control, via the Internet, of door status. For example, if a homeowner is not in proximity to its residence, and wants to determine whether the garage door the homeowner had intended to close, did in fact close, or whether the garage door it intended to leave open for a workman to enter, had in fact been left open, using one of these systems, the homeowner can, through access to the Internet, remotely monitor the status of the garage door (e.g., whether it is open or closed). Moreover, if the garage door is not in the desired position, these systems are designed to also enable the homeowner to transmit change-of-door status commands over the Internet to move the garage door to the desired position, all without having to be physically proximate the garage to do so.

These aforestated systems typically use means capable of determining the status of the garage door that is then remotely transmitted to the homeowner. For example, some systems use door status monitoring apparatus affixed to, or proximate, the garage door to directly monitor the garage door status. While this approach is generally acceptable for many applications, the requirement to have separate apparatus affixed to, or proximate, the garage door may, for various reasons, not be the most desired approach. Other systems have indirectly determined door status from the door controller of the garage door operator (i.e., from the microprocessor, microcontroller or other programmable platform of the garage door opener). However, these systems have not been entirely acceptable for all conditions of service.

It is therefore among the objectives of the embodiments of the remote door status monitoring and control system and method disclosed herein to present a new and improved version of such system and method that is reliable, takes advantage of Internet signal transmission, and is convenient to install and use.

SUMMARY

In accordance with the aforementioned and other objectives, disclosed herein are alternative embodiments of a remote movable barrier status monitoring and control system and method that enables the initial accurate determination of the status of a movable barrier (e.g., the garage door), such status typically being whether the door is open or closed, or closed or not closed, followed by the effective transmission of that door status, via the Internet, to the user of an Internet access device, like a Smartphone, so as to enable the user to remotely monitor the movable barrier status. Among the advantages of the herein described system and method is that the barrier status determination (i.e., the monitoring operation) is carried out (i) without the requirement of barrier monitoring apparatus physically attached to, or proximate, the monitored movable barrier (e.g., the garage door), and (ii) without having to obtain garage door status information from the garage door operator, nor particularly from the programmable platform controller of the garage door operator. Instead, the status determination operation of the present invention is derived from the operation of the motor that drives the garage door.

Accordingly, the disclosed system and method incorporating the principles of the present invention (i) initially produces motor signal pulses indicative of the extent and direction of rotation of the rotatable shaft of the motor associated with the monitored movable barrier, and therefore the extent and direction of travel of the movable barrier itself; and (ii) thereafter, pursuant to the programmable-controlled operation by a microprocessor, microcontroller, or the like in the door control module, these motor signal pulses are converted to digital signals indicative of the open/closed or other desired status of the movable barrier. Such digital door status signals are thereafter wirelessly transmitted by the door control module, via the Internet, to the remotely located Smartphone, or other suitable Internet access device.

Thereafter, in accordance with the control aspect of the hereindescribed remote status monitoring and control system, should it be determined that the status of the movable barrier (i.e., the garage door) should be changed (for example, from open to closed), the user of the Smartphone transmits a change-of-door status command back to the door control module, via the Internet, the door control module thereafter transmitting such command to the garage door operator, specifically the programmable platform controller, that then responsively directs the motor to move the garage door to the status (i.e., position) instructed by the change-of-door-status command. Thus, the garage door operator controller plays no role in determining the status of the garage door, its sole door-related function in the overall system of this invention being to transmit remotely (or locally) transmitted door movement commands to the motor.

Pursuant to alternate embodiments of the status determination portion of the disclosed system, motor signal pulses are initially generated by an encoder responsive to the rotational movement of the rotatable output shaft of the motor driving the garage door, the encoder producing motor signal pulses corresponding to the extent and direction of such rotational (angular) movement, and therefore corresponding to the extent and direction of movement of the door.

In accordance with one preferred embodiment of an encoder, the design and operation of which are subsequently described in greater detail, the generation of the motor signal pulses is provided by a rotary optical encoder that produces optical pulses corresponding to the extent and direction of rotation of the motor shaft, and therefore the extent and direction of door movement. This optical encoder includes a wheel attached to the rotatable output shaft of the motor and has spaced paddles projecting therefrom. The spaces or "gaps" between the paddles permit the selective passage of light therethrough, the light emanating from a light "transmitter" directing its light rays toward a light sensor or "receiver," dual optical pulse generators radially offset from one another a prescribed distance include respective sets of a light transmitter and light receiver, with the gapped wheel, rotating with the rotation of the motor shaft, disposed between a light transmitter and light receiver. The resulting pattern of light impingement on the light receivers, coupled with the angular displacement of the optical pulse generators, result in the generation of optical pulses indicative of the extent and direction of rotation of the motor shaft, and therefore the extent and direction of movement of the garage door within its travel limits. A phototransistor, forming part of the encoder, then converts these optical motor signal pulses to electrical motor signal pulses.

In accordance with a unique feature of the disclosed system, buffered ones of the electrical motor signal pulses are then routed to a microprocessor (or other programmable platform) of the door control module, where they are programmably processed/converted to digital signals indicative of the alternate status of the garage door, typically the open or closed status thereof.

Additional features, aspects, and objectives of the disclosed embodiments of the new and improved remote movable barrier status monitoring and control system and method will become readily apparent to those skilled in the art from the hereinafter detailed description, read in conjunction with the following drawings.

DETAILED DESCRIPTION

Embodiments of the remote movable barrier status monitoring and control system in accordance with the principles of the present invention, as defined solely by the appended claims, will be described below. These described embodiments are only non-limiting examples of implementations of the invention as defined solely by the attached claims. Additionally, in an effort to provide a focus of the description of important features of the disclosed embodiments emphasizing the principles of the present invention, some details that may be incorporated, or may prefer to be incorporated, in a commercial implementation of the hereindescribed system, but are not necessary for an understanding of the invention by one skilled in the art, have been omitted in order to highlight the important features relevant to an understanding of the invention. Also, the accompanying drawing figures are not necessarily to scale and certain elements may be shown in generalized, schematic or block diagram format in the interest of clarity and conciseness.

Figure 1:
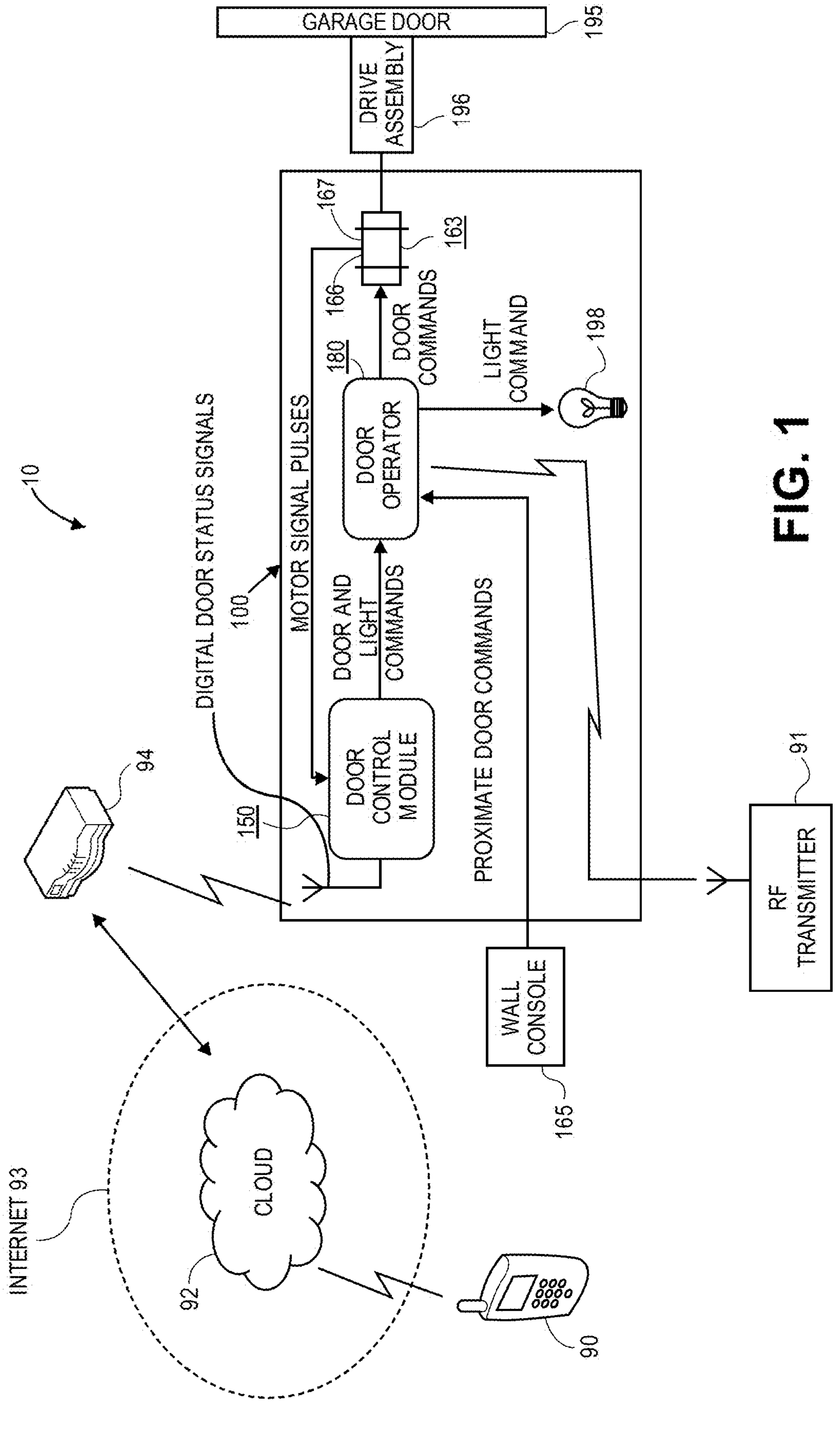
FIG. 1 is a block diagram of an embodiment of the interconnection of the principal components of a remote movable barrier status monitoring and control system in accordance with the principles of the present invention.

With initial reference now to FIG. 1, there is depicted a block diagram of the overall process, and interconnection of the principal components of a new and improved remote garage door status monitoring and control system 10, incorporating the principles of the present invention. Accordingly, the system 10 remotely determines and monitors the status (e.g., closed/not closed or open/closed) of the garage door 195 as well as remotely effecting change of the status of such door. Specifically, the system 10 includes a power head chassis 100 that encloses motor assembly 163, garage door operator 180, and door control module 150. As subsequently described in greater detail with reference to FIGS. 3-7, the motor assembly 163 includes (i) a motor 167 adapted to move the garage door in the conventional manner known by one of ordinary skill in the industry, and (ii) an encoder 166 integrated with the motor 167 for generating motor signal pulses responsive to the operation of the motor 167, and specifically responsive to, and indicative of, the extent and direction of rotation of the rotatable output shaft of motor 167, and therefore indicative of the extent and direction of travel of the garage door 195 between travel limits.

The motor 167 is operatively coupled to a conventional drive assembly 196, the motor 167 and drive assembly 196 effective to impart movement to the door 195 in accordance with door commands remotely and/or proximately transmitted to garage door operator 180 and thereafter to motor 167. The drive assembly 196 may be any of the standard and conventional drive assemblies available on the market that are suitable to move the garage door 195 in response to motor 167.

In accordance with the overall operation of the garage door status monitoring and control system 10, the motor signal pulses, generated to correspond to the operation of motor 167, and specifically indicative of the extent and direction of motor shaft rotation, and therefore the extent and direction (up or down) of garage door 195, are conductively transmitted by wire to the door control module 150, the design and operation of which are subsequently described with reference to FIGS. 2A and 2B. These motor signal pulses may initially be in the form, for example, of optical pulses, and then converted to electrical motor signal pulses inputted to door control module 150.

The door control module 150 is effective to process and convert the incoming motor signal pulses to digital door status signals indicative of the garage door status, for example "open/closed" or "closed/not closed" status, of the garage door 195. This door status information is then wirelessly transmitted by the door control module 150, via a WiFi home router 94, to (and for storage in) cloud server 92 of the Internet 93, where such status information is subsequently pushed to a Smartphone 90, or any other suitable Internet access device, such as a desktop or laptop computer, personal data assistant (PDA), mobile phone, tablet, or the like, for user review of the then current garage door status. It is emphasized that nowhere in system 10 is door status ever requested, the door status information always being "pushed" to the next component or stage.

With continuing reference to FIG. 1, the system 10 is also effective to wirelessly transmit a change-of-door-status command from Smartphone 90, via the Internet and cloud server 92, and home router 94, back to the door control module 150. Change-of-door-status commands may also be initiated from the Cloud server 92 in appropriate situations, such as a pre-programmed time-to-close, or other pre-programmed activities.

Upon receipt of the remotely generated change-of-door-status command, door control module 150 is effective to transmit the change-of-door-status (and corresponding light) commands to the garage door operator 180, specifically to the door controller 183 (FIG. 2A) of garage door operator 180, along with a command to flash the work light 198 in accordance with the sequence subsequently described. In accordance with conventional procedure, user-generated door toggle open/close commands may also be transmitted to the door operator 180 from wall console 165, which, as conventionally known, turns on the worklight 198 simultaneously with the operation of the motor 167. One or more hand-held or vehicle-mounted RF transmitters 91 proximate to the garage door 195 may also transmit door commands to the door operator 180 in similar manner as wall console 165.

Figure 2A:
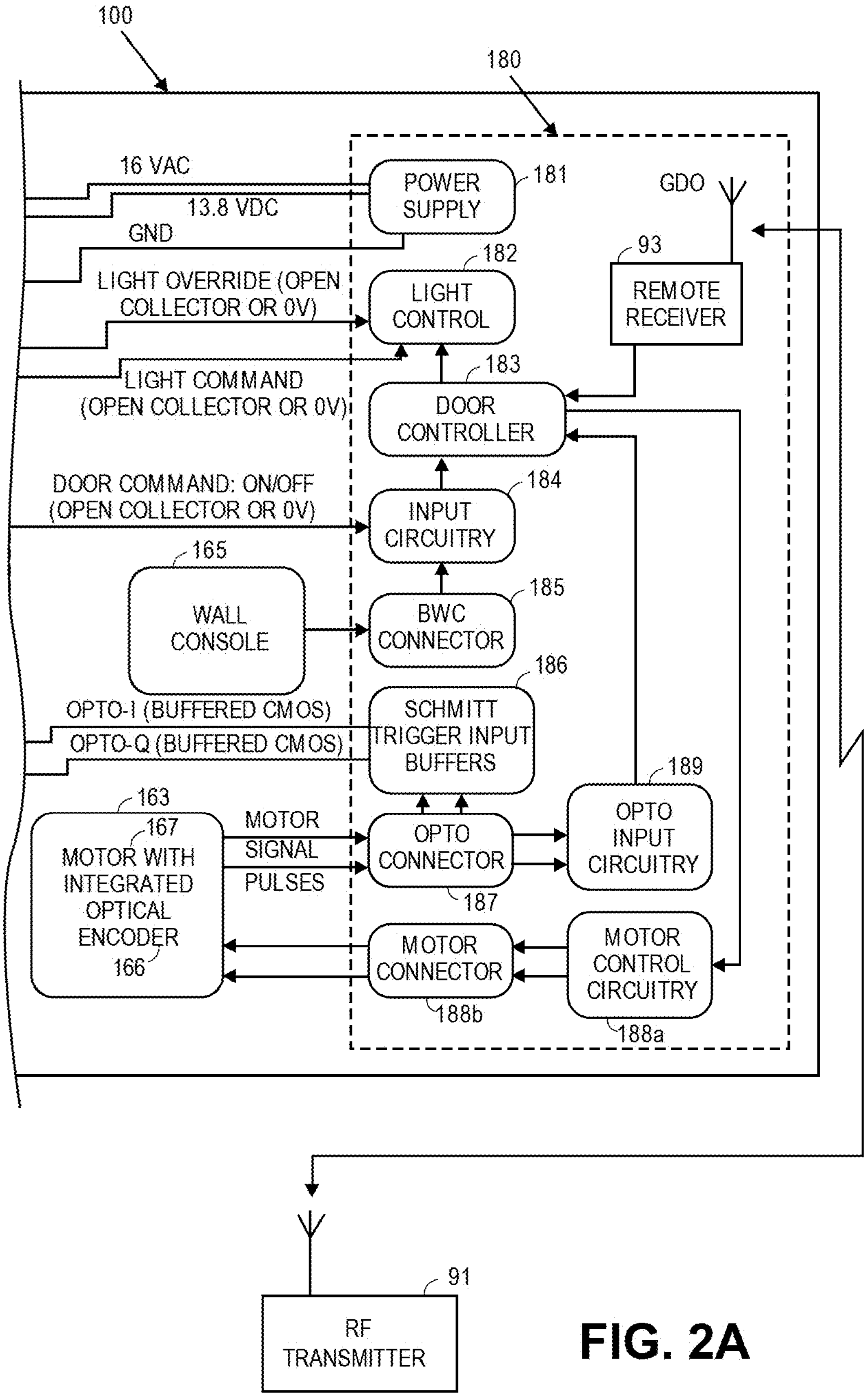
FIGS. 2A and 2B each respectively show a portion, and together show the entirety, of a more detailed schematic block diagram of the remote movable barrier status monitoring and control system of FIG. 1.
Figure 2B:
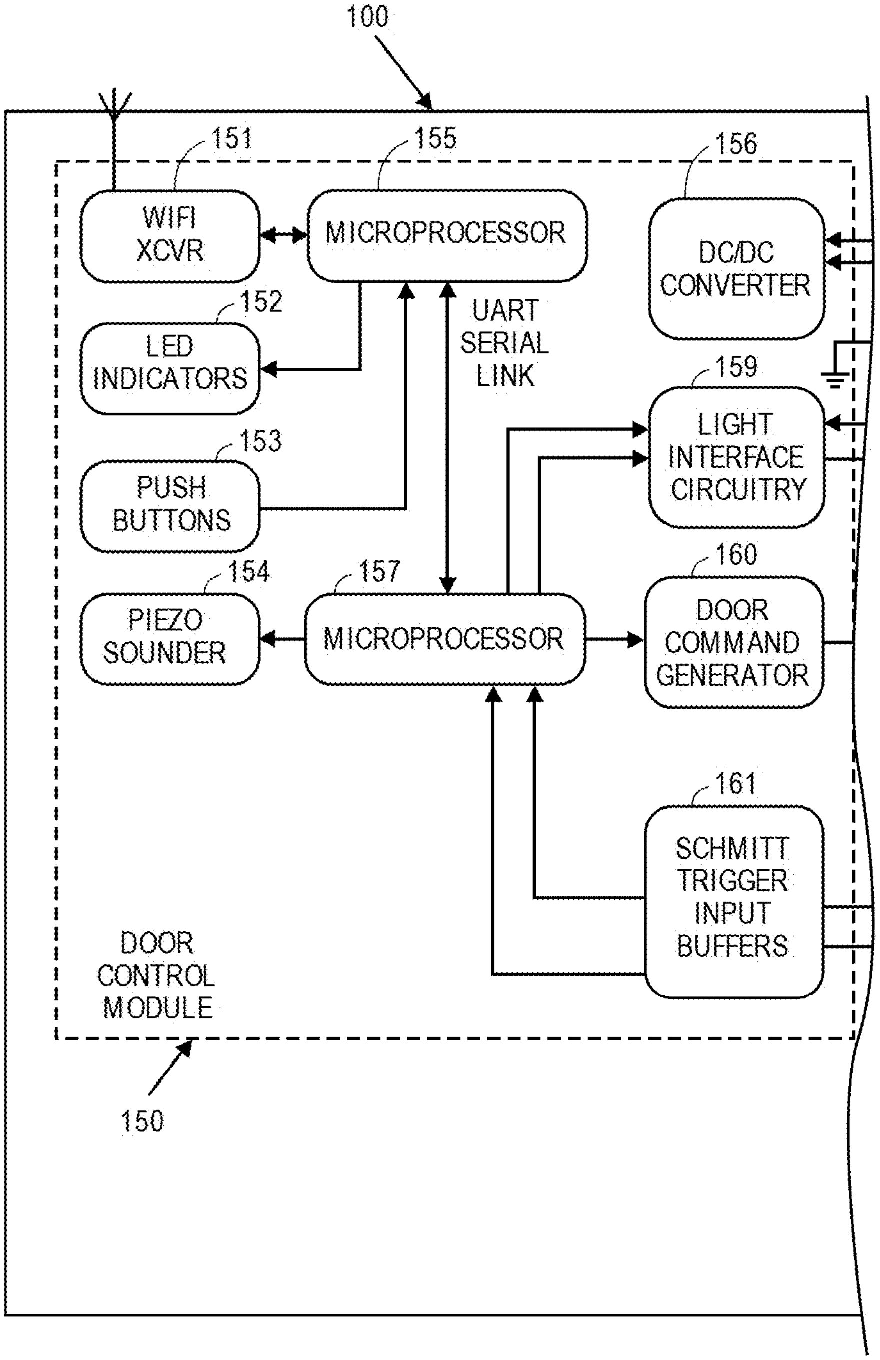
Figure 3:
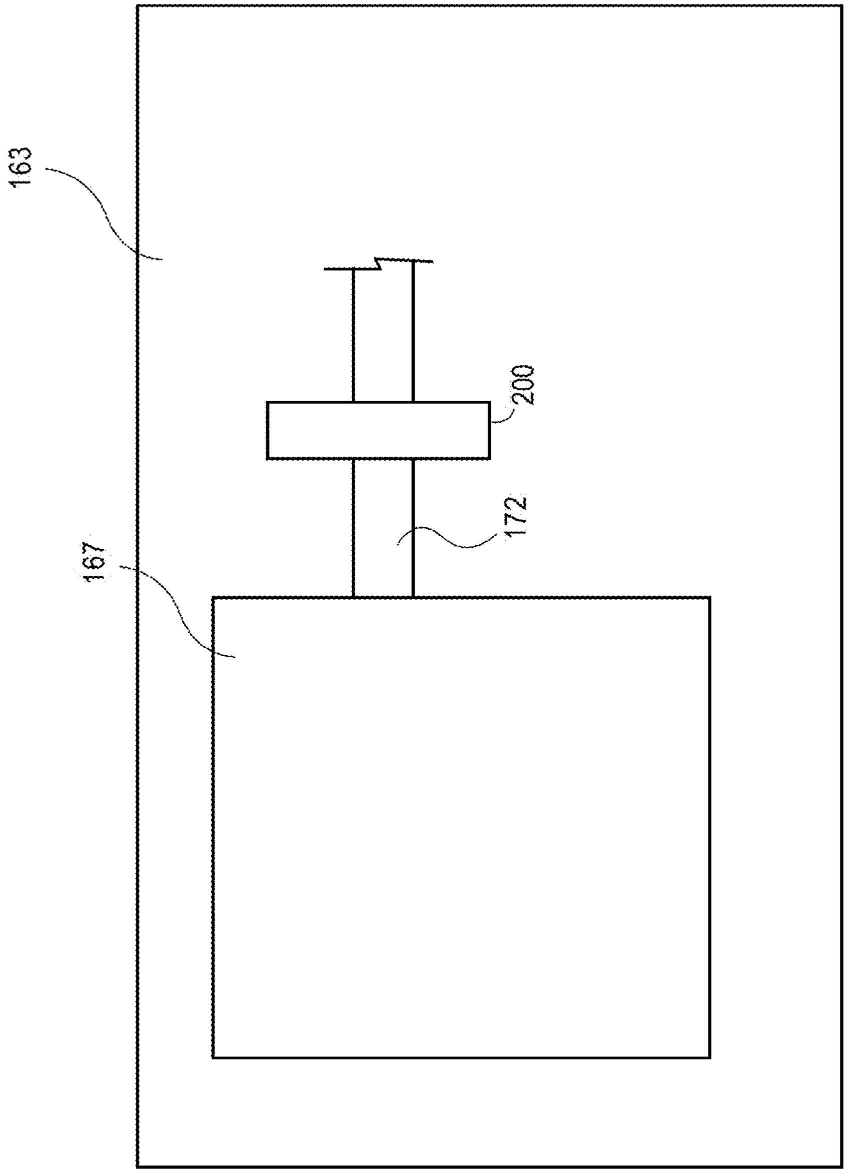
FIG. 3 is a schematic diagram of a motor pulse encoder responsive to the extent and direction of travel of a rotatable output shaft of a garage door motor adapted to move the garage door.

Referring now to FIGS. 2A and 2B, there is depicted a detailed schematic block diagram of a preferred embodiment of the garage door monitoring and control system 10 located within power head chassis 100. For clarity of presentation, the detailed schematic block diagram has been broken into two adjacent portions, namely FIG. 2A depicting, at the right side of the block diagram, the components of the garage door operator (GDO) 180, and FIG. 2B depicting, at the left side of the block diagram, the components of the door control module 150.

Referring initially to FIG. 2A, the motor assembly 163 includes (i) a motor 167, which in this embodiment is a DC motor, and (ii) an encoder 166 integrated with motor 167, the encoder 166 in this embodiment being a rotary optical encoder. While the rotary optical encoder may be of any design effective to generate optical motor signal pulses indicative of the extent and direction of rotation of the output shaft of motor 167, and therefore the extent and direction of travel between limits of the garage door 195, which are subsequently converted to corresponding electrical motor signal pulses, one preferred embodiment of the rotary optical encoder 166 produces a dual set of electrical output pulses in respective in-phase and quadrature format, and is subsequently described in greater detail in connection with FIGS. 3-7.

As illustrated in FIG. 2A, the encoder 166 generates a dual set of electrical motor signal pulses, the optical pulses initially generated by the encoder having been converted to electrical pulses by a phototransistor (not shown) forming part of the assembly of encoder 166. (As such, both the optical pulses and the electrical pulses are merely differing formats of the motor signal pulses referenced in FIG. 1.)

The electrical pulses are subsequently routed via opto connector 187 (which connects the encoder 166 with the GDO board) to and through input buffers 186 and, in turn, as electrical pulses Opto I and Opto-Q, are routed through input buffers 161 of door control module 150 (FIG. 2B). The dual set of electrical pulses are also routed via opto connector 187 to opto input circuitry 189, and thereafter to the door controller 183 where, among other functions, travel limits for the garage door 195 are maintained.

With continuing reference to FIG. 2B, the buffered electrical pulses from input buffers 161 are routed to microprocessor 157. In accordance with the technique subsequently described, these electrical pulses are then processed, preferably by programmable-controlled operation, by microprocessor 157 (or other programmable platform) to produce digital door status signals indicative of the status of the garage door 195 (e.g., "open or closed" or "closed or not closed"). The so-generated digital door status signals are then transmitted from microprocessor 157, by way of UART serial link, to microprocessor 157 (in direction of upwardly pointed arrow) for initial storage and WiFi conditioning, and thereafter transmission to transceiver 151, where the WiFi door status information is subsequently wirelessly transmitted, as previously described, via the Internet, to the Cloud server 92 and Smartphone 90 (FIG. 1).

The transceiver 151 of door control module 150 is effective to receive any remotely generated change-of-door-status command, such command then routed to microprocessor 155. After the change-of-door-status command is compared with the door status information previously stored in microprocessor 155, to assure that the change-of-door-status made the subject of the incoming command is not the same as the previously stored status, the incoming change-of-door-status command is then routed by microprocessor 155 (in direction of downwardly pointed arrow) to microprocessor 157.

The microprocessor 157 then routes the change-of-door-status command, via the door command generator 160 of the door control module 150, and via the input circuitry 184 of the garage door operator 180 (FIG. 2A), to the door controller 183 of garage door operator 180. The programmed controlled door controller 183 then, via motor controller circuitry 188*a* and motor connector 188*b*, instructs the motor 167 to move the garage door in compliance with the change-of-door-status command.

However, prior to the microprocessor 157 routing the change-of-door-status command to the door controller 183, the microprocessor 157 activates the piezo sounder 154 and light interface circuitry 159 to respectively sound the on board buzzer and flash the worklight 198, to warn anyone near the garage door of the imminent unattended movement of the garage door 195. Thus, when the microprocessor 157 receives the command to move the door 195, an annunciation period begins, during which the piezo sounder 154 and flashing light 198 are activated at the rate and duration in compliance with UL325 requirements. After this annunciation period has expired, the microprocessor 157 then transmits the change-of-door-status command to the door controller 183.

In accordance with the preferred embodiment of the rotary optical encoder 166, reference now is to FIGS. 3-7 of the drawings. Accordingly, this embodiment of rotary optical encoder 166 is comprised principally of (i) a wheel 200 affixed to the rotatable shaft 172 of the motor 167 (FIGS. 3 & 7), (ii) dual angularly spaced optical pulse generators 168 and 169 (FIG. 7), with respect to which wheel 200 rotates in conjunction with the rotation of the output shaft of motor 167, generating optical pulses indicative of the extent and direction of rotation of the output shaft, and (iii) a phototransistor converting the optical pulses to electrical pulses.

Figure 4:
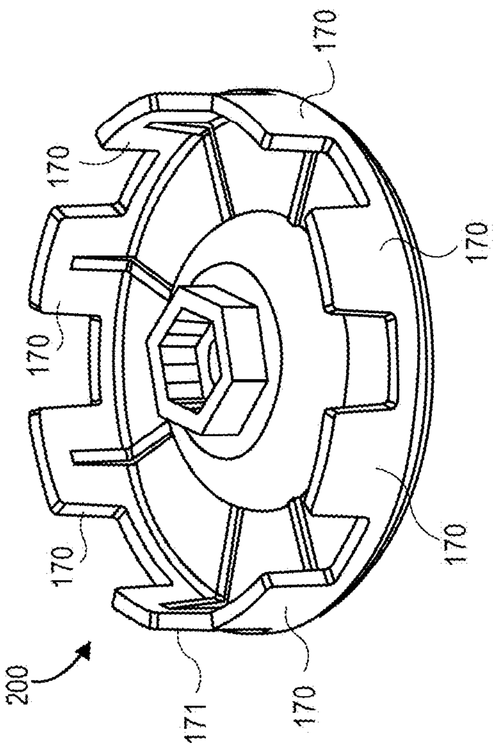
FIG. 4 is a perspective view of the gapped wheel portion of a preferred embodiment of a rotary optical encoder providing the function of the motor pulse encoder of FIG. 3.
Figure 5:
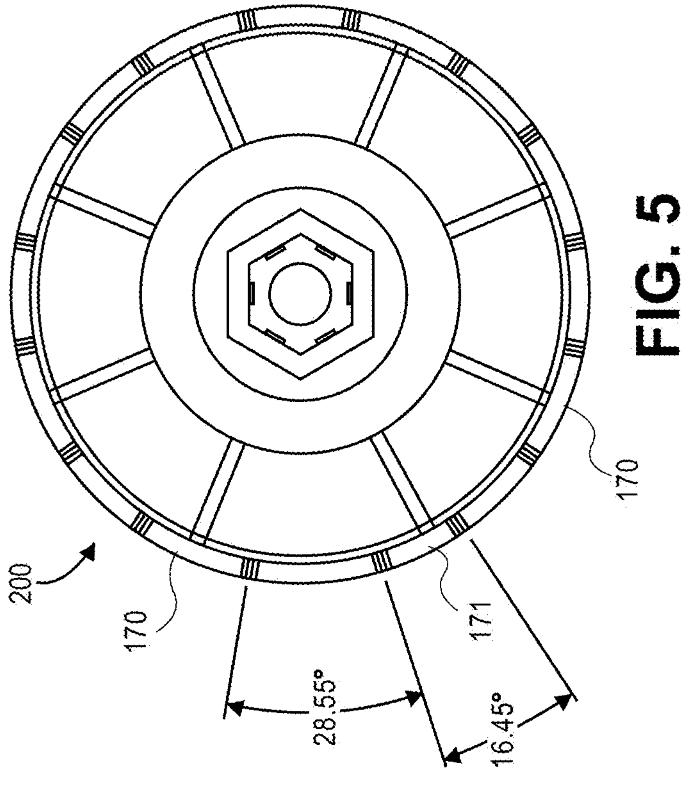
FIG. 5 is a front view of the wheel of FIG. 4.
Figure 7:
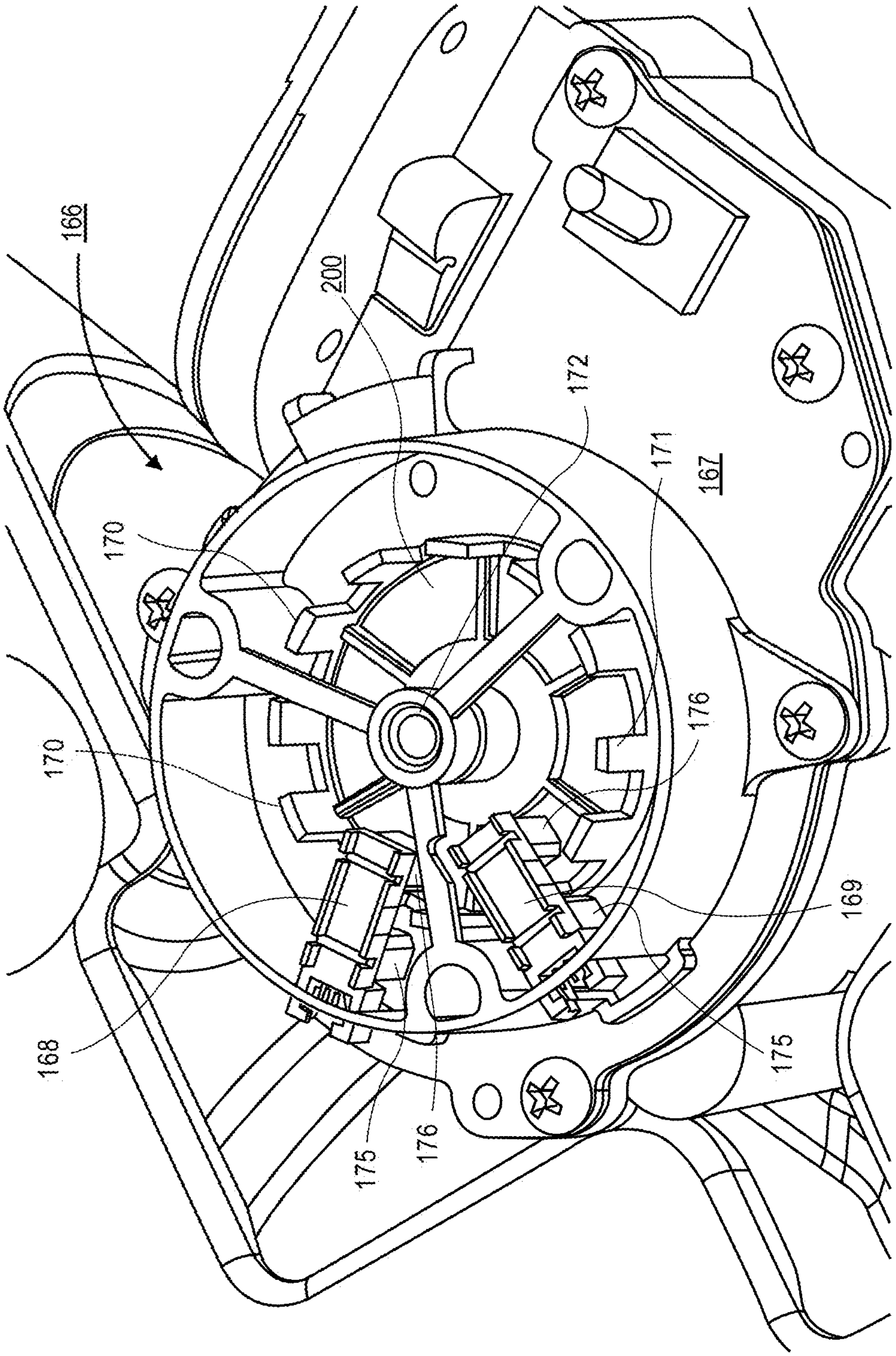
FIG. 7 is a perspective view of the mounting and interaction of the gapped wheel illustrated in FIGS. 4-6 with respective optical pulse generators of the rotary optical encoder.

As best illustrated in FIGS. 4 & 7, wheel 200 has a plurality of upwardly extending, spaced apart, and identically dimensioned paddles 170. Notably, wheel 200 also has a single, upwardly extending, paddle 171, of a differential (e.g., narrower) size or dimension than that of paddles 170. As shown in FIG. 4, the paddles 170 are arranged in an annular, castellated type, array. The two optical pulse generators 168 and 169 each include a light transmitter 176 and a light receiver 175. The light transmitters of optical pulse generators 168 and 169 are positioned to direct light rays at the light receivers of optical pulse generators 168 and 169. However, when the wheel rotates as a consequence of motor shaft rotation, the spaced paddles interrupt the light rays, and generate optical pulses, in accordance with a pattern defined by the pattern of the paddles and the spaces therebetween.

Thus, the identically sized and spaced paddles 170 provide for the generation of evenly spaced optical pulses of the same pulse length, with the paddle 171 providing a light pulse after a shorter interval. While the spacing between paddles may be in accordance with whatever output is desired, in the preferred embodiment shown (and best illustrated in FIG. 5), the angular spacing between adjacent paddles 170 is approximately 16.45°, with the spacing between paddle 171 and an adjacent paddle 170 being approximately 28.55° due to the narrower size of the paddle 171. The result of having a narrower sized paddle 171 is that one reference pulse is generated for a given number of equally spaced typical pulses 170. In the illustrated embodiment, this would be 15 spaced pulses between paddles 171, and one additional reference pulse for each full rotation of the wheel 200.

Figure 6:
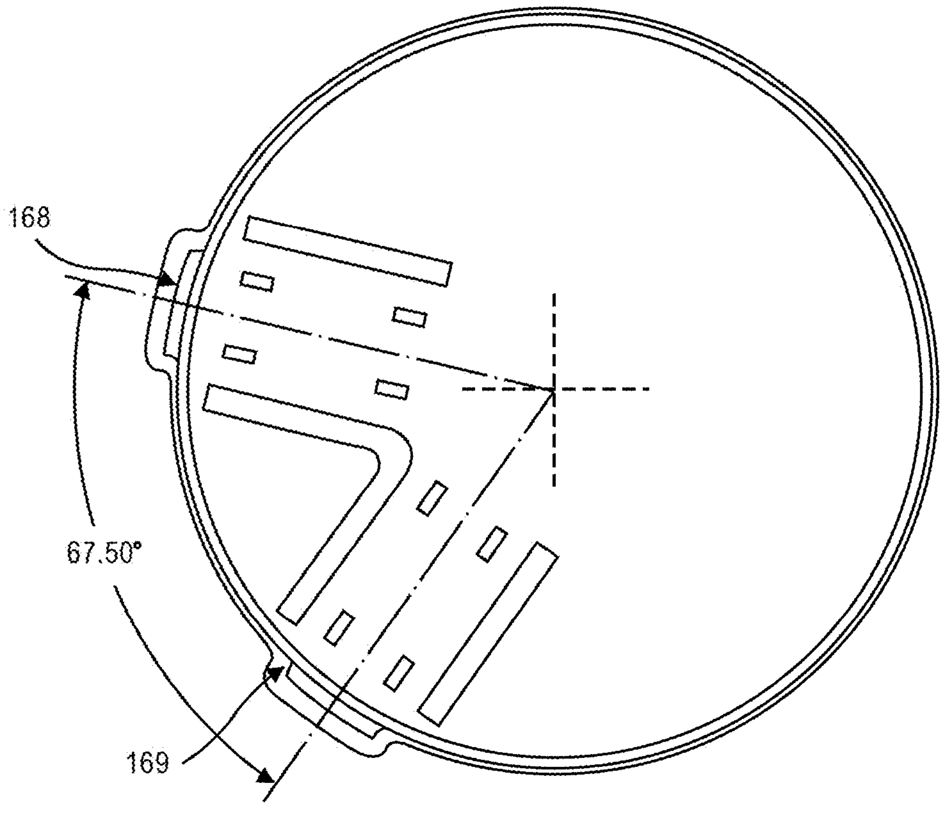
FIG. 6 is a top view of the cover of the wheel of FIG. 4.

As best illustrated in FIG. 6, the optical pulse generators 168 and 169 are preferably angularly spaced from one another by 67.50°. This spacing, and the angular spacing between the paddles 170 and 171, are so designed that when the wheel 200 rotates in a first direction, both the pulse generator 168 and the pulse generator 169 simultaneously generate an optical pulse, but when the wheel 200 rotates in an opposite direction, only the pulse generator 168 generates an optical pulse. Thus, a first pattern of optical pulses are generated by pulse generators 168-169 when the motor shaft is rotating in, say, a clockwise direction, while a second pattern of optical pulses are generated by pulse generators 168-169 when rotating in a counterclockwise direction.

The processing of the motor signal pulses from the encoder 166 may be in accordance with programmable software executed by microprocessor 157. For example, the processing algorithms of such software may be directed to reliably performing the task of determining the location of the close limit and tracking position to determine when the garage door is in sufficient proximity to that close limit to declare the door as being "closed." All other detected positions of the door may then be declared as "not closed", or "open." Thus, the microprocessor 157, under control of the algorithm of the software, may infer, from the motor signal pulse inputs, that it has run in one direction for a predetermined minimum time and then stopped, that the door is away from the other limit. Therefore, if the door runs upwardly and then stops, the determination is that it is not at the close limit. Another algorithm may then be used to confirm that finding. Thus, microprocessor 157, under control of that algorithm, may record that the minimum and maximum positions that are detected are the working limits.

Thus, in accordance with the monitoring aspect of the system 10 that determines the existing door status, the microprocessor 157 interprets the motor signal pulses (i.e., the electrical pulses routed from the input buffers 161 when using a rotary optical encoder) in order to determine the status of the barrier 195. For example, if the first pattern of motor signal pulses are generated (as a consequence of the clockwise rotation of the motor shaft), then the microprocessor 157 interprets the incoming electrical pulses to indicate that the door 195 has moved in the open direction. If the second pattern of motor signal pulses are generated (as a consequence of the counterclockwise rotation of the motor shaft), then the microprocessor 157 interprets the incoming electrical pulses to indicate that the door 195 has moved in the closed direction.

In summary, the microprocessor 157 may be programmed to use a variety of methods to determine whether the door 195 is closed or not closed, or closed or open. Thus, in accordance with programming of one method, or algorithm, if the pattern of electrical pulses includes at least a predetermined threshold number of pulses, the microprocessor 157 may then interpret the door 195 to be "closed." Conversely, if the pattern of electrical pulses includes less than the predetermined threshold number of pulses, the microprocessor 157 interprets the barrier to be not closed or open.

As another example, the microprocessor 157 may be programmed to interpret a first pattern of electrical pulses inputted therein, for a predetermined first threshold of time, to mean that the door 195 has moved in the open direction, and is not closed, and to interpret a second pattern of pulses, for a second predetermined threshold of time, to mean that the door 195 is fully closed.

These predetermined threshold periods of time may be user input from the smartphone 90, which then transmits the periods via the Internet, to the microprocessor 157 over the Internet 93/Cloud 92. Alternatively, the predetermined threshold periods of time may be factory programmed into microprocessor 157.

The microprocessor 157 may use the presence or absence of the electrical pulses to verify proper operation. For example, if pulses are not received at the anticipated intervals, then an error has occurred that may mean that the door 195 is stuck. In accordance with a feature of some embodiments of system 10, if errors are detected, the barrier opener system 10 may stop the door 195 or cause it to stop and reverse direction of travel.

In accordance with another feature of the system 10, electrical power is provided by power supply 181 not only to the garage door operator (GDO) 180, but also to the door control module 150 after conversion to a suitable voltage level by the DC/DC converter 156. The primary power supplied is 16 VAC, with a secondary 13.8 VDC line from a battery. The door control module 150 and garage door operator 180 share a common ground. It should be noted that in instances where the door control module 150 is operating on the 13.8 VDC line, the processor 155 may be shut down to conserve power.

Various type apparatus may be used for the pulse encoder 166. For example, an absolute position sensor may be used to detect the angular position of the rotatable motor shaft. An example of a suitable absolute position sensor that can be used as a magnetic pulse generator for pulse encoder 166 is described in U.S. Pat. No. 8,113,263, to Reed et al., issued Feb. 14, 2012, and entitled Barrier Operator With Magnetic Position Sensor, which is incorporated herein by reference in its entirety.

Various modifications may be made to the disclosed embodiments without departing from the principles of the present invention. For example, while the specific examples set forth above describe transmitting the door status information, or transmitting the change-of-door-status command, via a separate Wi-Fi home router 94, it should be understood that this is a non-limiting example, and the router 94 may alternatively be part of the Internet 93.

Moreover, those skilled in the art, having benefit of this disclosure, will appreciate that other embodiments can be envisioned that do not depart from the spirit and scope of the invention as defined solely by the attached claims, and equivalents thereof.

What is claimed is:

1. Apparatus for remotely monitoring the closed and not closed positions of a garage door, comprising:

a motor operable to move a the garage door between the not closed and closed positions, a garage door operator having a programmed controlled garage door controller operable and configured to instruct the motor to cause and control the movement of move the garage door;

an encoder in an integrated relationship with the motor operable and configured to automatically generate motor signal pulses in response to operation of the motor indicative of the direction of rotation of the output shaft of the motor and the direction of movement of the garage door;

a programmable-controlled microprocessor, different from the programmed controlled garage door controller, configured to:

receive the motor signal pulses;

determine from the motor signal pulses the location corresponding to the closed status position of the garage door;

thereafter, determine whether the garage door, when stopped, is in sufficient pre-set proximity to the determined location, to thereby be in "closed" status, or if not, to thereby be in "not closed" status; and thereafter, generate digital door status signals indicative of the garage door status position; and a wireless transceiver for transmitting, via Internet, to a remotely located Internet access device, the closed or not closed garage door status;

the programmable-controlled microprocessor additionally configured to receive a change-of-garage door position command to activate the door controller.

2. The apparatus of claim 1 in which the motor signal pulses, but not the digital door status signals, are routed to the door controller.

3. The apparatus of claim 1, in which the encoder is a rotary optical encoder.

4. The apparatus as defined by claim 1 in which the optical encoder comprises (i) a wheel having spaced paddles projecting therefrom with spaces defined between the paddles, the wheel affixed to the rotatable output shaft of the motor for rotation therewith, and (ii) a pair of optical pulse generators, said optical pulse generators being angularly disposed with respect to one another, and each having a light transmitter and a light receiver, rays of light emanating from said light transmitter toward said light receiver, the rotating wheel interrupting the light received by the light receivers in a pattern that, coupled with the angular displacement of the optical pulse generators, result in the generation of said motor signal pulses.

5. Apparatus for (i) enabling the remote monitoring, via the Internet, of the open or closed status of a garage door adapted to be driven between open and closed travel limits by a motor responsive to instructions from a garage door operator controller, the motor having a rotatable motor shaft, which direction of rotation determines the direction of travel of the garage door, said apparatus additionally (ii) enabling a change of door status in response to its receipt of a change-of-door status command wirelessly transmitted, via the Internet, from a remote location, said apparatus comprising:

an encoder associated with said motor for generating electrical motor pulses in response to, and corresponding to the direction of, rotation of the motor shaft and indicative of the directional movement of the garage door;

a programmable-controlled microprocessor, separate from the door operator controller, for processing the electrical motor pulses to generate digital door status signals indicative of either the open or closed status of the garage door, said microprocessor to enable the processing configured to (a) initially determine from the electrical motor pulses the location of the close travel limit of the garage door, and (b) thereafter determine whether the garage door, when stopped, is in sufficient proximity of the close travel limit to be in closed status, or if not, to thereby be in open status;

a transceiver for wirelessly transmitting the so determined status of the garage door, via the Internet, to a remotely located Internet access monitoring device, the so determined status of the garage door being directed to the transceiver from the programmable-controlled microprocessor, and not from the door operator controller and circuitry routing said change-of-door status command, via the transceiver, to said programmable-controlled microprocessor, the microprocessor configured to responsively initially actuate a flashing light warning, and thereafter actuate the garage door operator controller, the actuating of the garage door operator controller delayed a predetermined time period after the actuation of the flashing light warning, the predetermined time period programmed into the microprocessor.

6. Apparatus for enabling a remote monitoring of the closed and not closed positional door status of a garage door, the apparatus comprising:

a mechanism for imparting motion to the garage door, comprising:

a motor having a rotatable motor shaft, and a drive assembly intermediate the motor and the garage door;

a garage door operator for causing the motor and drive assembly to move the garage door between its travel limit positions, comprising:

a first programmable-controlled microprocessor for instructing the motor to control the movement of the garage door; and motor control circuitry electrically connected to the output of the programmable door controller and to the input of the motor;

an electronic monitoring network for the determination of the closed or not closed positional door status of the garage door, after the garage door has ceased its movement between the travel limit positions, (i) without monitoring apparatus proximate to the garage door and (ii) without obtaining positional door status from the programmable door controller, the electronic monitoring network comprising:

an encoder operably associated with the motor for generating electrical motor pulses corresponding to the rotation of the motor shaft and directional movement of the garage door;

a second programmable-controlled microprocessor for generating digital signals respectively indicative of the closed or not closed positional door status of the garage door, the second programmable controlled microprocessor configured to:

(a) determine the location of the closed travel limit of the garage door from the electrical motor pulses, and (b) thereafter determine whether the garage door, when stopped, is within a pre-defined proximity of the closed travel limit; and transmitter means wirelessly transmitting closed or not closed positional door status information corresponding to the positional door status represented by the digital signals via Internet.

* * * * *